(12) United States Patent
Bleasdale

(10) Patent No.: US 9,771,700 B2
(45) Date of Patent: Sep. 26, 2017

(54) STRUCTURES FOR OFFSHORE INSTALLATIONS

(71) Applicant: OWLC HOLDINGS LTD., Leicester (GB)

(72) Inventor: Matthew Bleasdale, Leicester (GB)

(73) Assignee: OWLC HOLDINGS LTD., Leicestershire (GB)

( * ) Notice: Subject to any disclaimer, the term of this patent is extended or adjusted under 35 U.S.C. 154(b) by 0 days.

(21) Appl. No.: 14/386,906

(22) PCT Filed: Mar. 12, 2013

(86) PCT No.: PCT/GB2013/050601
§ 371 (c)(1),
(2) Date: Sep. 22, 2014

(87) PCT Pub. No.: WO2013/144558
PCT Pub. Date: Oct. 3, 2013

(65) Prior Publication Data
US 2015/0056020 A1 Feb. 26, 2015

(30) Foreign Application Priority Data

Mar. 24, 2012 (GB) ................................. 1205192.6
Jun. 6, 2012 (GB) ................................. 1209914.9
(Continued)

(51) Int. Cl.
*E02B 17/00* (2006.01)
*E02B 17/02* (2006.01)
*F03D 13/20* (2016.01)

(52) U.S. Cl.
CPC .......... *E02B 17/00* (2013.01); *E02B 17/0017* (2013.01); *E02B 17/025* (2013.01);
(Continued)

(58) Field of Classification Search
USPC .............................. 405/195.1, 203–205, 207
See application file for complete search history.

(56) References Cited

U.S. PATENT DOCUMENTS 3,645,104 A 2/1972 Hogan
4,018,057 A * 4/1977 Erzen .................. E02B 17/0004
405/205
(Continued)

FOREIGN PATENT DOCUMENTS

CA 1007873 A 4/1977
CN 1174584 A 2/1998
(Continued)

OTHER PUBLICATIONS

Written Opinion of the International Preliminary Examining Authority, Jan. 1, 2014; 6 pgs.
(Continued)

*Primary Examiner* — Sean Andrish
(74) *Attorney, Agent, or Firm* — Eckert Seamans Cherin & Mellott, LLC; David C. Jenkins

(57) ABSTRACT

A structure for mounting offshore installations such as wind turbines or oil and gas platforms. The structure comprises a base, a top piece, and a lattice structure connecting the base to the top piece. The sub-components of the structure can be pre-assembled prior to installation to facilitate ease of construction, or they may be transported to a pre-determined location and assembled on site.

4 Claims, 16 Drawing Sheets

(30) Foreign Application Priority Data

| Jun. 14, 2012 | (GB) | 1210624.1 |
|---|---|---|
| Jun. 16, 2012 | (GB) | 1210715.7 |
| Jun. 18, 2012 | (GB) | 1210801.5 |
| Jun. 29, 2012 | (GB) | 1211640.6 |
| Jun. 29, 2012 | (GB) | 1211641.4 |
| Dec. 4, 2012 | (GB) | 1221745.1 |

(52) U.S. Cl.
CPC ........ *F03D 13/22* (2016.05); *E02B 2017/006* (2013.01); *E02B 2017/0091* (2013.01); *E02B 2017/0095* (2013.01); *F05B 2240/9121* (2013.01); *F05B 2240/95* (2013.01); *Y02E 10/727* (2013.01); *Y02E 10/728* (2013.01)

(56) References Cited

U.S. PATENT DOCUMENTS

| 4,038,830 | A | | 8/1977 | Sumner | |
|---|---|---|---|---|---|
| 4,106,302 | A | | 8/1978 | Vogel | |
| 4,583,881 | A | * | 4/1986 | Steele | E02B 17/021 405/196 |
| 4,723,875 | A | | 2/1988 | Sutton | |
| 4,934,872 | A | | 6/1990 | Klausen | |
| 4,998,844 | A | * | 3/1991 | Mouton | E02B 3/06 405/15 |
| 5,551,801 | A | * | 9/1996 | Gallaher | E02B 17/021 405/196 |
| 2007/0269272 | A1 | * | 11/2007 | Kothnur | E02D 27/42 405/195.1 |
| 2009/0307998 | A1 | * | 12/2009 | Zavitz | E04H 12/12 52/152 |
| 2010/0226785 | A1 | * | 9/2010 | Livingston | E04H 12/10 416/244 R |
| 2011/0061321 | A1 | * | 3/2011 | Phuly | E02D 27/42 52/297 |
| 2012/0282036 | A1 | | 11/2012 | Taenaka et al. | |
| 2013/0272796 | A1 | * | 10/2013 | Horton, III | E02B 17/02 405/204 |

FOREIGN PATENT DOCUMENTS

| CN | 2414001 Y | 1/2001 |
|---|---|---|
| CN | 101351606 A | 1/2009 |
| CN | 102296629 A | 12/2011 |
| DE | 103 57 392 A1 | 4/2005 |
| EP | 2 511 425 A1 | 10/2012 |
| GB | 2 124 684 A | 2/1984 |
| WO | 94/06970 A1 | 3/1994 |
| WO | WO9620313 | 7/1996 |
| WO | WO2006124562 | 11/2006 |
| WO | 2010/147481 A1 | 12/2010 |
| WO | 2011/070190 A1 | 6/2011 |
| WO | 2011068152 A1 | 6/2011 |

OTHER PUBLICATIONS

International Preliminary Report on Patentability. Jun. 24, 2014; 6 pgs.
Smith and Minton, Chapter 10, Vectors and the Geometry of Space, 2002 McGraw-Hill Companies, Inc., 1 pg.
The Westin Grand Munchen, Vladimir Shukhov, Hyperboloid Water Tower, 1896 Photo disclosing a Land-Based Hyperboloid Water Tower Structure, 1 page.
OWLC Holdings Ltd., EP 13717968.5 Communication Pursuant to Article 94(3) EPC,May 30, 2016, 6 pages.
OWLC Holdings Ltd., CA2867927, Office Action and Examiner's Search Report, May 17, 2016, 3 pages.

\* cited by examiner

STRUCTURES FOR OFFSHORE INSTALLATIONS

FIELD OF THE INVENTION

The present invention relates to structures for mounting offshore installations, and in particular to structures which may be easily constructed to mount wind turbines thereon.

BACKGROUND TO THE INVENTION

More and more offshore wind farms are being built in European waters and significant numbers are planned elsewhere around the world. In general, the offshore wind farms built to date are relatively near to shore or in shallow waters; however the water depths that they are being installed in are: increasing. While, the majority of turbines currently installed offshore have power outputs typically in the range from 3-5 MW, they have consistently been increasing in size and a number of larger turbines are now being developed. Due to the trend for larger turbines in deeper water depths, the technical capabilities of the turbine foundations used to date are proving limited. As such foundations are becoming larger and heavier in order to be able to withstand the greater forces experienced.

The predominant foundation type in the industry to date is known as a monopile. It consists of a large diameter steel tubular section which is piled into the seabed. The process of piling is both lengthy and noisy, and induces significant stress to the structure reducing its fatigue life. In addition, environmental concerns about the noise emitted during installation can restrict the opportunity to conduct piling both seasonally (due to the impact on the environmental receptors, such as marine mammals and fish, including their spawn) and over the day/night cycle (due to the impact on human receptors).

As both turbine sizes and water depths increase, the cost of monopile foundations and the technical difficulties associated with their installation also increase. While larger diameter monopole solutions have been proposed to accommodate larger turbines and deeper waters, the forces required to install them increase significantly, as such so do the noise and induced stresses. In addition the forces experienced by the structure through the action of waves, tides and currents also increase significantly. As the hydrodynamic forces increase so do affects such as the scour of the sediments surrounding the structure. All of these issues add to the design requirements for the foundation adding cost in terms of the materials required to withstand the stresses at the same time as limiting the stresses imparted to the seabed.

In addition to the above, the types of seabed that are suitable for monopiles are limited. Certain geological types, such as chalk, do not interact well with the stresses and moments imparted to the seabed. Chalk, for example, crumbles when stressed (as during piling, or when loaded and unloaded by a cyclical moment) and thus does not exert the desired forces upon the pile. Similarly other seabed types do not have the desired structural capacity to support the pile, or the pile's design is required to be modified to reduce the forces imparted to a suitable level, increasing cost.

While substructures and foundation types other than monopiles have been used, these have so far been used in limited numbers. The use of substructures such as gravity bases and jackets has been limited by water depths, wave climates and the cost associated with their manufacture. To date other structures such as tripods and tripiles have only been used in very limited numbers.

Gravity bases have predominantly been used in the Baltic Sea where the water is relatively shallow and the wave regime is not as energetic as in the North Sea. They are large, typically concrete, structures often filled with aggregate to add mass. The restricted use of gravity bases is because of the cost of their manufacture, which is linked to the materials, space and time required to produce them. Large construction areas are also required, for longer periods per foundation due to: the nature of casting a concrete structure-of significant height. In addition, the quantity of material involved, especially when designed for deep or energetic waters, adds to the cost and manufacturing time and increases the spatial requirement of proposed sites.

As gravity bases are such massive structures, the issues associated with them are similarly significant. Once installed the size of the submerged structure leads to significant hydrodynamic effects, such as scour of the seabed and the forces experienced by the structure. As the hydrodynamic forces are so significant, the design of the structure is required to be large enough to accommodate them, adding mass and cost. In addition, as the structure is submerged, any mass that is added has associated buoyancy which means that it is less effective in exerting a force to act against those imposed upon the structure, thus the full capacity of the mass inherent to the structure is not utilised and the overall size of the structure needs to be increased to offset the effect of buoyancy, in turn increasing the forces experienced by the structure. As the forces experienced by the structure are significant so are those imparted to the seabed as such, prior to installation gravity bases typically require seabed preparation to ensure a level surface and reinforce the load bearing properties of the sediments. Such seabed preparation increases cost, time and risk of the offshore operations.

Jacket foundations have been used in deeper waters, although their cost has limited the number of installations. Jackets are steel lattice structures that are secured to the seabed through the use of piles. Their cost is associated with the space required to manufacture them, the amount of time and effort taken to weld the structure, the amount of material required as well as the cost of piling and installing the jacket. As significant tensile and compressive forces are transferred to the lattice structure of the jacket, the detailed engineering and fabrication of the top section of the jacket is a significant aspect contributing to the cost of the overall structure. The requirement to secure die jacket to the seabed through the use of piles means that the noise implications of installation remain a significant concern for the industry.

A few other substructure types have been used, or proposed, for offshore wind turbines including, tripods, tripiles, and various floating designs. Tripods used, or proposed to date, have or would, require significant amounts of fabrication work as-well as piling, both of which drive up costs. Tripiles also require piling, and the detailed engineering to distribute the stresses at the top of the structure is complex and costly. Floating foundation designs have been prototyped however they require significant water depths, or entail significant fabrication and material costs.

While the oil and gas industry only require a few installations per field, the relatively high cost of the structures themselves can be absorbed into the overall cost of the business model. In the case of offshore wind, due to the high number of structures required, it is in part these high costs that currently prevent the industry from becoming a mature and competitive technology. It would be advantageous to make offshore wind competitive by having a structure that is low cost, simply and speedily manufactured with lower spatial requirements than current foundation types, quickly assembled, and may be easily deployed to a location of choice. It would be further advantageous if the structure could be installed with little or no noise emission during the installation process, and if limited or no seabed preparation was required. It would be highly advantageous if that structure were also relatively stiff and capable of handling a range of forces exerted upon it, to enable an assortment of turbine types to be installed thereon.

SUMMARY OF THE INVENTION

The invention aims to address the above problems by providing a structure (or gravity base foundation) with high hydrodynamic transparency and low submerged volume limiting the forces imparted onto the structure as well as the buoyancy inherent in it. The design minimises the forces and controls the frequencies during the operation phase that are exerted upon the seabed by the structure and hence the structure itself requires little or no seabed preparation, The structure is stiff and capable of handling a wide range of load cases, thus enabling it to be flexible In. accommodating a range of installation designs and design requirements In terms of the varying characteristics of installation locations and seabed types. The design, of the structure limits the tensile forces transferred between sub-components, reducing the engineering and fabrication requirements of the joints within the structure. While the structure may be of a single or integral construction, the structure will preferably utilise a range of sub-components (e.g., base, lattice and top piece) to facilitate the manufacture and assembly.

By providing a base in the form, of a submerged slab (as opposed to a ground penetrating structure) and combining It with other sub-components to form a structure then in summary:

the mass of the structure can be kept to a minimum, hence minimising direct forces on the seabed and extending the range of seabed types that are suitable for installation of offshore structures the submerged cross-sectional area can be reduced, hence limiting hydrodynamically induced forces and the occurrence of scour piling can be avoided, hence reducing installation time, cost, risk and associated noise seabed preparation can be minimised or in some cases completely avoided deviations from horizontal can be corrected on installation of the other sub-components Accordingly, the present invention provides a structure for mounting offshore installations (e.g., wind turbines), the structure comprising a top piece (sometimes referred to below as a massive top piece (i.e., a top piece that has a significant mass) or a gravity transition piece), a base (Or gravity slab), and a load-transferring lattice (or jacket) connecting the top piece to the base.

In this specification terms such as "up", "upper", "lower", "above" and "below" are used with reference to the structure in its normal use orientation. For example, the skilled person will appreciate that the structure is configured to be used in a substantially upright configuration when, positioned on a seabed, taking into account small deviations in the morphology of the seabed. Thus, a reference to a lower surface means a surface that would face down towards to the seabed in use.

The base may be a low profile, large surface area, slab which distributes the forces exerted upon the seabed to reduce the bearing pressure. Preferably the base will be formed from reinforced concrete, and will inherently have a mass of its own which may be utilised, in the design case where the overall structure is not kept in a purely compressive state, to offset any residual tensile forces transferred through the load-transferring lattice. By minimising the pressure exerted upon the seabed, limited preparation of the seabed (if any) and subsequent reinforcing is required. The base can be self-installing (i.e., so that it floats, is towed out to site and sunk into place) or such that it is lifted into place. The need for a seabed penetrating structure or piling is avoided.

The base may be formed to include voids within it such that they are capable of accommodating quantities of water, or other material. Through the inclusion of materials other than water, the submerged weight of the base can be optimised to offset any forces upon the structure, while through the inclusion of either water or other materials the installation of the base may be optimised. By adjusting the velocity and momentum of the base during installation it is possible to plastically deform the seabed, upon impact of the base with it, such that the seabed is both smoothed and reinforced through compaction as a result of the interaction.

The base is preferably designed with one or more mating interfaces, having either female or male connecting parts, to accommodate the load-transferring lattice. It will be appreciated by the skilled person that the base may include one or more male connecting parts and the lattice may have a corresponding number of complementary-formed female connecting parts or vice versa. A combination of male and female connecting parts can be used. The mating interfaces also enable the structure to be tolerant to a range of seabed inclinations, by allowing the addition of material to the mating interfaces, for example through the use of shims, grout, filler or sleeves. The mating interfaces can be integrally formed in the base as it is cast.

Detachable pre-cast shims or sleeves can be utilised with the one or more mating interfaces to alter the inclination of the plane of the base/lattice structure interface. More particularly, one or more shims can be placed inside an opening or mating interface on the upper surface of the base that defines a female connecting part so that the complementary male connecting part rests on the shim(s) in use. The mating interfaces may comprise means for receiving grout, or filler, to female interfaces, or sleeves to male interfaces, to ensure that the mating interfaces can be levelled at minimal cost. A combination of shims, grout, filler and sleeves may be used, The base may comprise at least one aperture extending from an upper surface of the base through to a lower surface of the base. In an embodiment of the invention, the base comprises at least one tapering surface extending from the lower surface of the base to an aperture. The aperture and tapered surfaces permit the base to be easily lowered to the seabed. The size of the aperture can be selected to determine the rate at which the base may descend through a body of water. Tapering of the lower surface of the base facilitates the stable flow of water through the aperture as well as optimising the pressure exerted by the base during the impact with the seabed. By optimising the rate at which the base descends and impacts on the seabed, it is possible for the base to plastically deform the sediment layer beneath the base such that the local morphology of the seabed can be evened out. This allows an even spread of forces over the entire surface of the base. In addition the plastic deformation of the seabed can reinforce the seabed sediments through the compaction of them. The aperture can be provided at a central part of the base.

The base may have a substantially triangular shape with a mating interface being provided at each apex. Alternative shapes, such as substantially square or other shapes, may be utilised.

In an embodiment of the invention, the base preferably comprises one or more scour protection mattresses. (Scour is the removal of sediment by hydrodynamic action and can have the effect of destabilising the structure.) Each scour protection mattress is preferably formed from concrete and may be integrally formed with the base. Each mattress preferably comprises a series of concrete portions which are attached together by attachment means, e.g. polypropylene cables, in a manner analogous to the struts that are held together to support a mattress in a bed (hence the term concrete mattress). The same attachment means may form the attachment mechanism to the base through incorporation; during manufacture of the base. An alternative to the incorporation of the attachment means during the manufacture of the base is that each concrete mattress may be attached to the base prior to installation.

The concrete portions may optionally be substantially cylindrical. Ideally each concrete mattress may be stored in a curled or rolled up configuration during the base transportation and installation process. Once the base has been mounted at its preferred location, the mattresses are untied and the concrete portions are allowed to unfold down onto the seabed. Preferably, each scour protection mattress will be constructed such that, when in the curled configuration prior to deployment, the centre of mass of the scour protection mattress remains outside the pivot point of connection to the base. This keeps tension on the attachment means and ensures that, when released, each mattress will unfold and deploy around the base under its own weight. Through the use of concrete mattresses, hydrodynamic action is dissociated from the seabed sediments adjacent to the base and instead is offset to the point at which the mattress terminates. Through the translocation of the hydrodynamic scour action, the sensitivity of the overall design to the removal of seabed sediments is reduced. The dimensions of the concrete mattresses may be optimised, to accommodate the design case for the expected level of seabed scour. Through optimally dimensioning the concrete mattress, the extreme angle at which the sediments immediately adjacent to the base may achieve through the action of scour can be controlled and hence the bearing capacity of the seabed may be maintained.

The load-transferring lattice is preferably configured to be mounted on the base and is designed to transfer the forces between the top piece and the base. Once mounted to the lattice, the base may also provide the tensile capability to accommodate any horizontal spreading forces imparted to it by the lattice structure. The use of material, such as grout, to secure the interface points between the base and the lattice may be utilised to transfer forces, such as spreading or residual tensile loads, from the lattice to the base. The lattice is preferably formed from concrete, however may be formed from, steel. By having a low submerged profile, the lattice remains hydro-dynamically efficient and so does not induce large loads within the structure due to waves, tides and currents, or significant seabed scour action. The lattice may have any suitable design, such as a conventional lattice structure design for standard jacket foundations, or an Improved design based on a hyperboloid configuration that is described in more detail below, The lattice may include a plurality of substantially vertically extending struts, optionally in the form of pre-east hollow tubular members that are cost effective to manufacture.

The exemplary design, a hyperboloid jacket, preferably comprises one or more pairs of substantially vertically extending struts, configured such that, they take on a hyperboloid configuration. By so doing the forces on the structure are transferred between the base and the top piece through unidirectional forces only, simplifying the design and manufacturing process of the structure as well as facilitating the use of materials, such as concrete, which are less tolerant to multi-directional stresses. The hyperboloid jacket may be maintained in a compressive state through the application of a suitable compressive load by means of the top piece. An advantage of the struts being in compression is a finite fatigue crack length from cyclical loading, as such the design case for materials such as steel is simplified. In addition, for materials such as concrete, the application of a compressive load simplifies the design and manufacture of the struts, through the application of a compressive load the concrete struts become post-stressed concrete.

A lattice haying a hyperboloid configuration (e.g. a hyperboloid jacket) may be used with other types of support structure, not necessarily those having a base and a top piece. In other words the present invention provides a structure for mounting offshore installations, the structure comprising a load-transferring lattice having a hyperboloid configuration. Further features of such a lattice can be found herein.

In an embodiment of the invention, the lattice may be designed to accommodate the routing of cables through the components of the lattice, to minimise the requirement for any secondary structure for that purpose, thus reducing the cost of both manufacture and maintenance. The cable-routing means can be provided in the-form of one or more channels (cable ducts) within the lattice structure, including through the nodes and struts mentioned below, for example.

In an embodiment of the invention, the lattice preferably comprises a basal ring adjacent the base and a top ring adjacent the top piece. The basal ring and the top ring may be formed from concrete. The substantially vertically extending struts may extend between and are held in position by the basal ring and top ring of the lattice. The basal ring is preferably formed by a plurality of base nodes interconnected by base struts. Each base node is preferably configured to attach to the lower end of two substantially vertically extending struts, with the base struts being preferably configured to connect adjacent base nodes together to form the basal ring. The top ring is likewise preferably formed by a plurality of top nodes interconnected by top struts. Each top node is preferably configured to attach to the upper end of a substantially vertically extending strut, with the top struts being preferably configured to connect adjacent top nodes together to form the top ring. The top ring and basal ring effectively form locking means to permit the substantially vertically extending struts to be held in position so that: (a) the lattice may be mounted on the base, and (b) the top piece may be mounted on the lattice, by means of corresponding or complementary mating interfaces.

The nodes, struts etc, may be pre-cast in concrete and then connected together to form the basal and top rings.

The top piece is configured to be located onto the top of the lattice and may be formed from concrete, or other suitable materials such as steel. It is a massive and wide structure designed to resolve, either all or a large proportion of overturning loads exerted by the installation mounted upon it (e.g. a wind turbine) into compressive forces. The top piece preferably comprises at least one recess or other mounting feature in order to mount the installation thereon. In the case of offshore structures such as oil platforms, gas platforms and offshore substations, the top piece may be an integral part of the structure of the installation. In addition, the top piece accommodates the forces exerted upon it by loads transferred from the load-transferring lattice, such as those imposed through wave impact. In the design case where the structure is kept in compressive loads only, it exerts a force that compresses the whole of the structure and thus may be used to post-stress the lattice structure if required. This may be particularly desirable for lattices made from materials such as concrete. The top piece may accommodate frequency management devices such as un-damped vibration absorbers, or active dampening mechanisms, in order to manage the vibrations of the structure and hence the frequencies imparted to either the installation or the seabed. Through the inclusion of vibration absorption, the management of the frequencies induced in the structure through the action of either the installation or waves, may prevent the design sensitivities, such as the frequency sensitivity of the seabed, from increasing the cost of the overall structure.

The top piece may be used with other types of support structure, not necessarily those having a base and a lattice. In other words the present invention provides a structure for mounting offshore installations, the structure comprising a top piece that is separately mountable to a support structure. Further features of such a top piece can be found herein.

In an embodiment of the invention, the top piece is capable of having mass added to it through the inclusion of one or more ballast tanks mounted on the top piece, which may be filled with water, aggregate or other suitable materials as desired, The ballast tanks may be integrally formed with the top piece and if provided as empty regions or chambers within the top piece (see below) they may be defined at least in part by internal walls of the top piece. A lower surface of the top piece preferably includes one or more mating interfaces for connecting the top piece to the lattice. An opening may be located at a mating interface to facilitate the routing of cables through the lattice and/or top piece. The mating interfaces can be integrally formed in the top piece as it is cast.

Ballast tanks, empty regions or chambers defined within the top piece may have additional material introduced Into them to increase the overall mass of the top piece such that the top piece is sufficiently heavy, and has a sufficient diameter, to resolve any overturning moment exerted upon the structure into purely compressive forces, (In other words, the top piece can be a substantially hollow structure.) In the purely compressive design case, the additional material may increase the mass of the top piece such that it exerts a load onto the lattice structure. The effect of this may be to post-stress the lattice structure which, in the case that the structure is made of certain materials such as concrete, may be desirable. The load applied to the structure can be adjusted as required to ensure that the design accommodates the forces exerted by a supported Installation, for example, while optimising tire forces exerted upon the lattice.

Due to the location of the top piece above the waterline when the structure is installed for use, any mass added to the top piece does not displace water and so the forces exerted are not reduced by buoyant effects as would be the case for mass added below the waterline. As such it is thus possible to use water, as opposed to other materials such as aggregates, to add mass to the top piece at effectively no cost. Of course, this does not exclude the use of other materials. In addition, by avoiding the buoyant effect of materials added to the top piece, the structure may make use of a minimal amount of material both in terms of the fabric of the structure as well as in terms of the material added to the structure.

The sub-components of the structure (i.e., the base, top piece and lattice) may be assembled together prior to installation, or it is anticipated that they may be transferred separately and assembled on site. When transferred separately, it is possible to securely position the base in position first, before connecting the lattice to the base and subsequently the top piece and the installation to be supported to the lattice. This minimises the risk that the structure is not mounted securely, as steps can be taken prior to installing the next sub-component of the invention to ensure that a stable base or foundation is provided.

The structure may be mounted or Installed on the seabed. However, the skilled person will appreciate that the structure may be tethered in the water so that an installation, e.g. a wind turbine, may be mounted thereon. In this arrangement, the base may be buoyant in order for the structure to be tethered in the water. The skilled person will appreciate that the base would therefore preferably further comprise additional securing means for securing the base to the seabed.

One or more structures can be used to support a single installation so that it cm be mounted offshore. For example, a gas or oil platform having a plurality of feet may be anchored to the seabed or tethered in the water by a plurality of structures according to the present invention.

DRAWINGS

Specific embodiments of the invention are now described by way of example and with reference to the accompanying drawings in which like numerals are used to indicate like parts and where:

SPECIFIC EMBODIMENTS OF THE INVENTION

Figure 1:
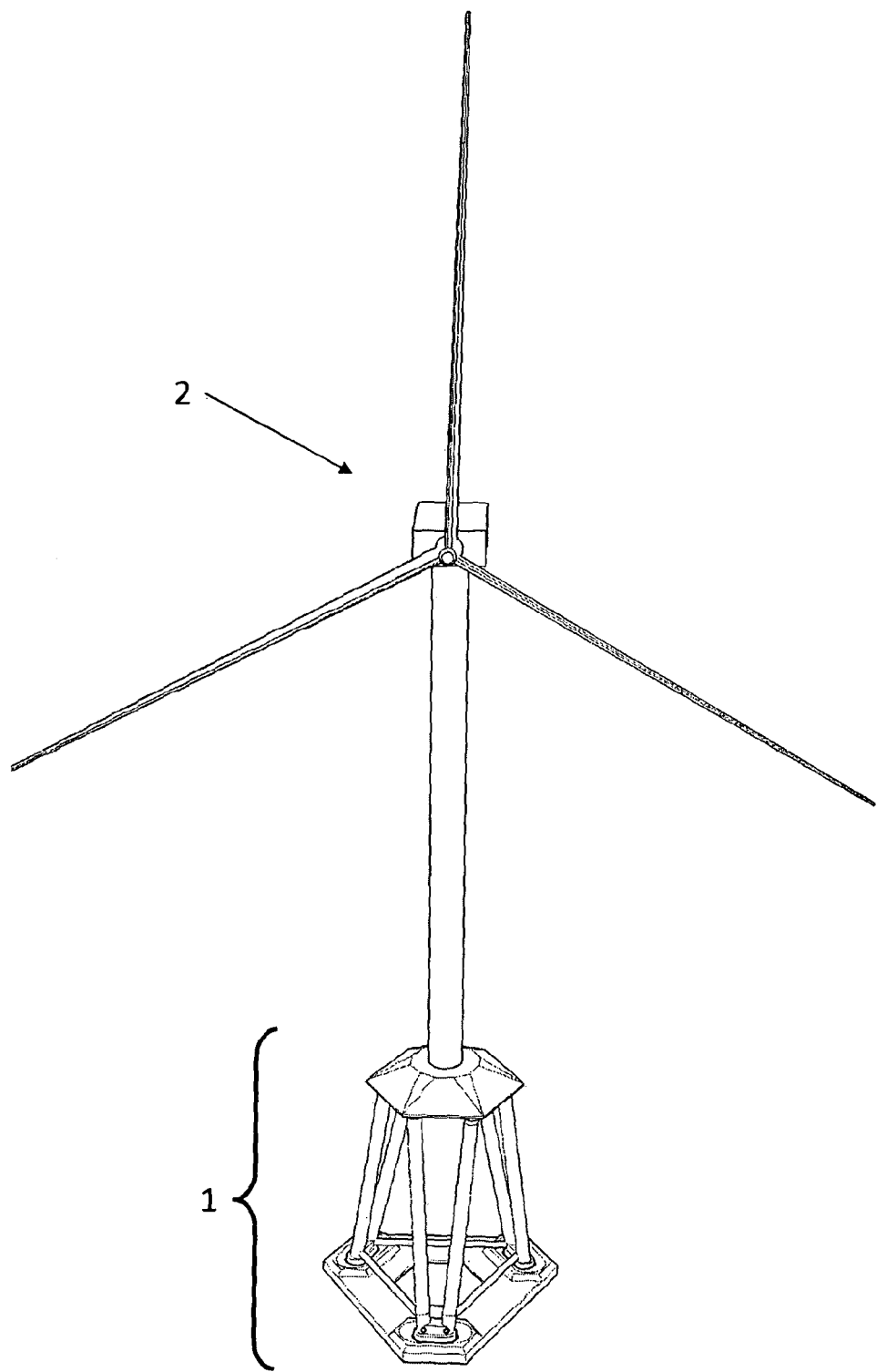
FIG. 1 shows a structure according to the present invention installed with a wind turbine.

Referring now to the drawings, FIG. 1 shows a structure 1 (or gravity jacket foundation) according to the present invention for mounting an offshore installation thereon, e.g. a wind turbine 2.

Figure 2:
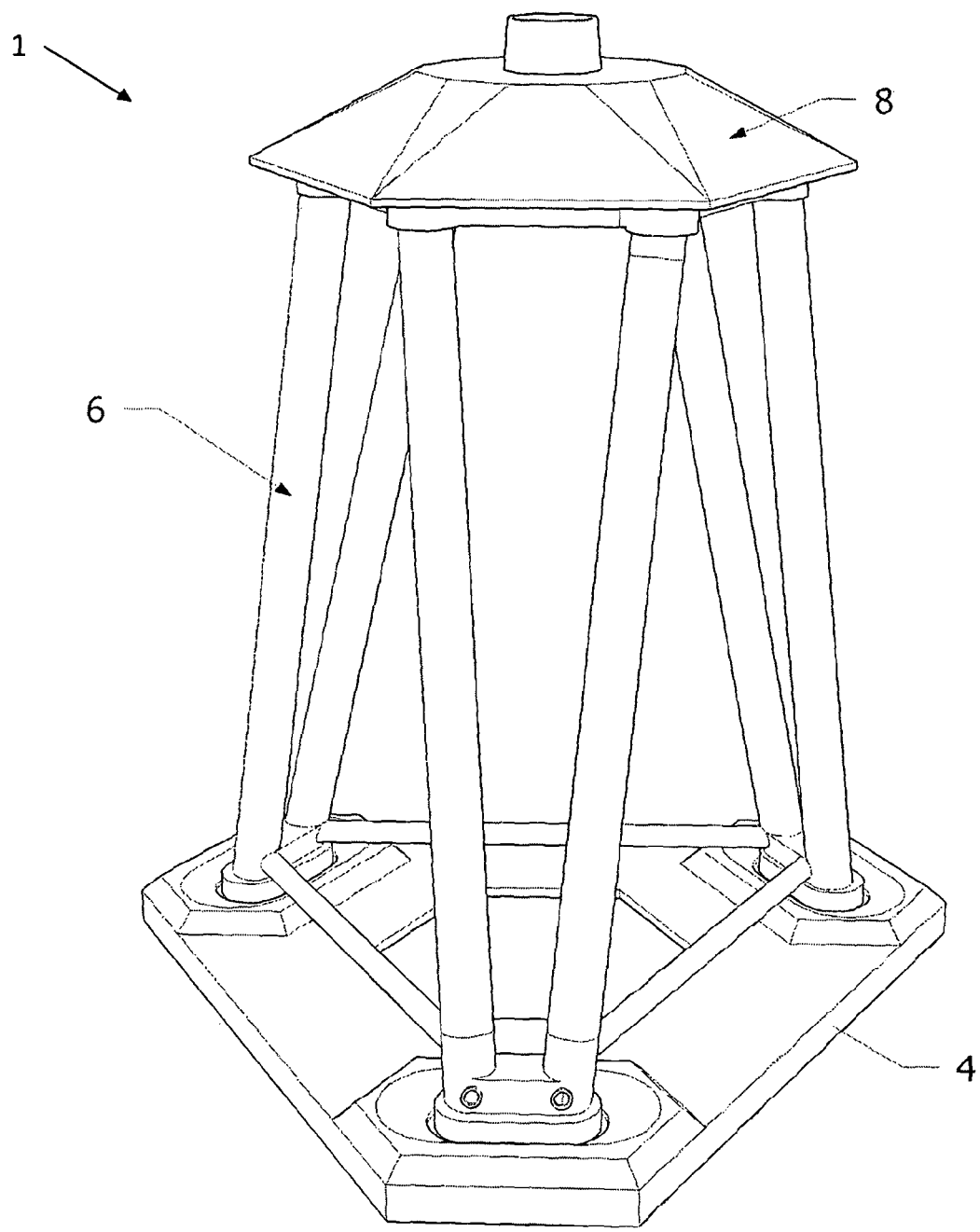
FIG. 2 shows the three main sub-components of the invention of FIG. 1.

The sub-components of the structure 1 are shown in more detail in FIG. 2 and include a base 4 (or gravity slab), a load-transferring lattice 6 (or hyperboloid jacket), and a top piece 8 (or gravity transition piece).

The base 4 sits on the seabed SB (FIG. 20) and acts as a load spreader, managing the pressure exerted on the seabed by the structure 1. The lattice 6 reduces the hydrodynamic forces experienced by the structure 1 and transfers the forces impacted by the installation (e.g., the wind turbine 2) through the wave zone to the seabed. The top piece 8 acts as the principle mass for the structure 1. It stresses the struts of the lattice 6 and contributes to good frequency characteristics. The sub-components combine to reduce loads induced through hydrodynamics on the structure 1, while remaining a stiff, massive structure with good frequency characteristics. The design is capable of accommodating a wide range of different types of wind turbine 2 (and other installations) and reduces the forces applied to the seabed thereby avoiding the need for seabed preparation. The structure 1 can significantly reduce offshore construction times by avoiding the need for piling and seabed preparation.

FIGS. 4 to 7 show a base 4 cast from concrete and having three mating interfaces 10 for mounting the lattice 6 onto the base 4. The base may be formed to include voids 7 within it such that they are capable of accommodating quantities of water, or other material. Each mating Interface 10 is located at an apex of the base 4 and has tapered sides 12 to simplify the installation processes through reducing the positional tolerance required to locate the lattice 6. The base 4 includes an aperture 14 extending From an upper surface 16 of the base 4 through to a lower surface 18 of the base 4. The base 4 includes six tapering surfaces 20, each surface 20 extending upwards from a lower surface 18 of the base 4 towards the aperture 14.

Figure 7:
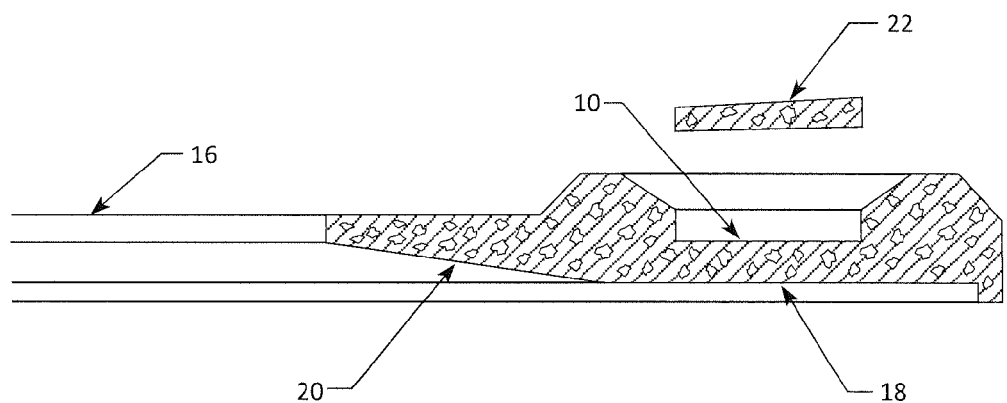
FIG. 7 shows an alternative view of FIG. 6 additionally comprising a pre-cast shim.

In this example, the mating interfaces 10 on the base 4 are shown as female connecting parts but male connecting pails (or a mixture of male and female connecting parts) could also be provided. FIG. 7 shows an additional pre-cast weighted shim 22 that can be introduced into a female mating interface 10 to permit, any deviations in the level of the structure 1 to be rectified on the seabed. In an alternative arrangement where the mating interface 10 of the base 4 includes male connecting parts, a pre-cast weighted tubular or substantially conical sleeve (not shown) can be used for a similar purpose.

Figure 8:
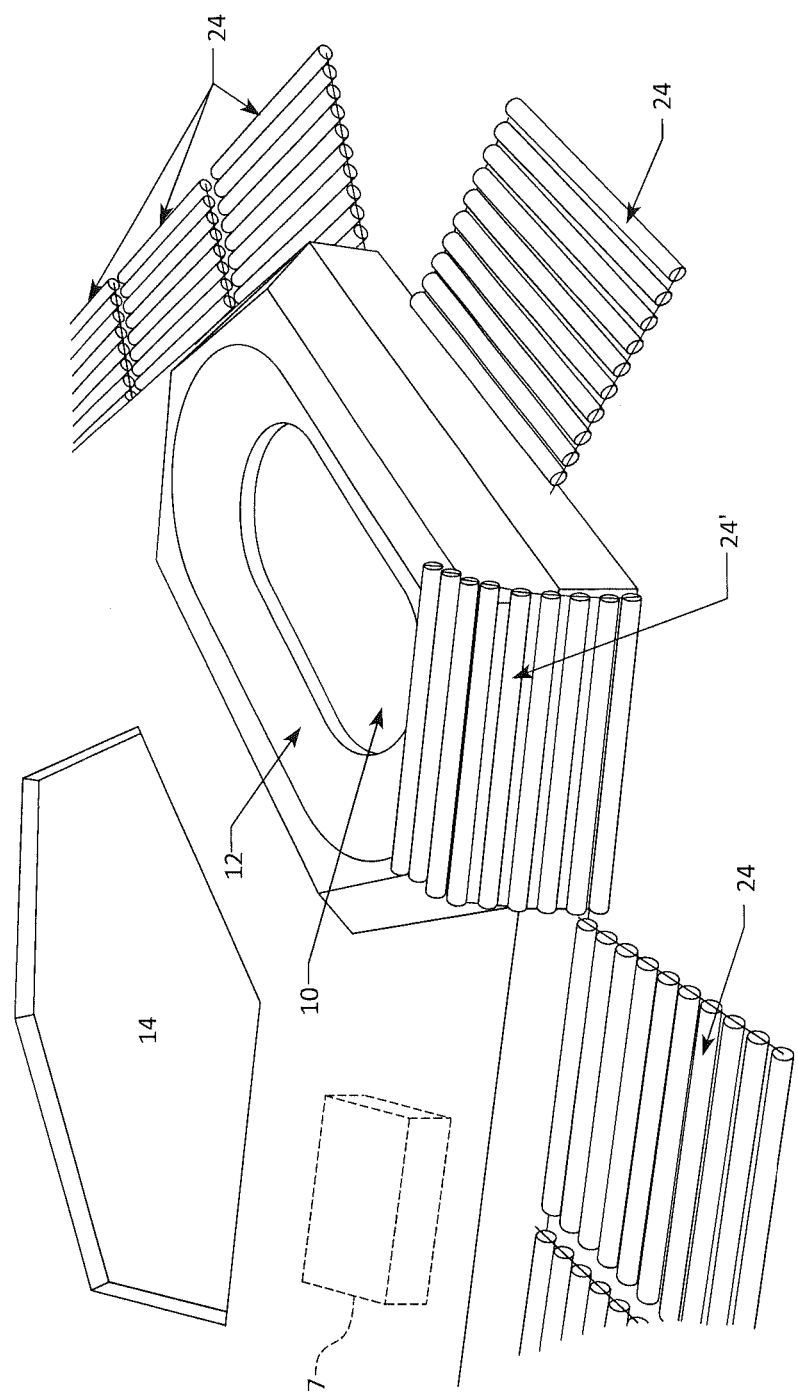
FIG. 8 shows a partial view of the base of FIG. 4 additionally comprising integrated scour protection mattresses.
Figure 9:
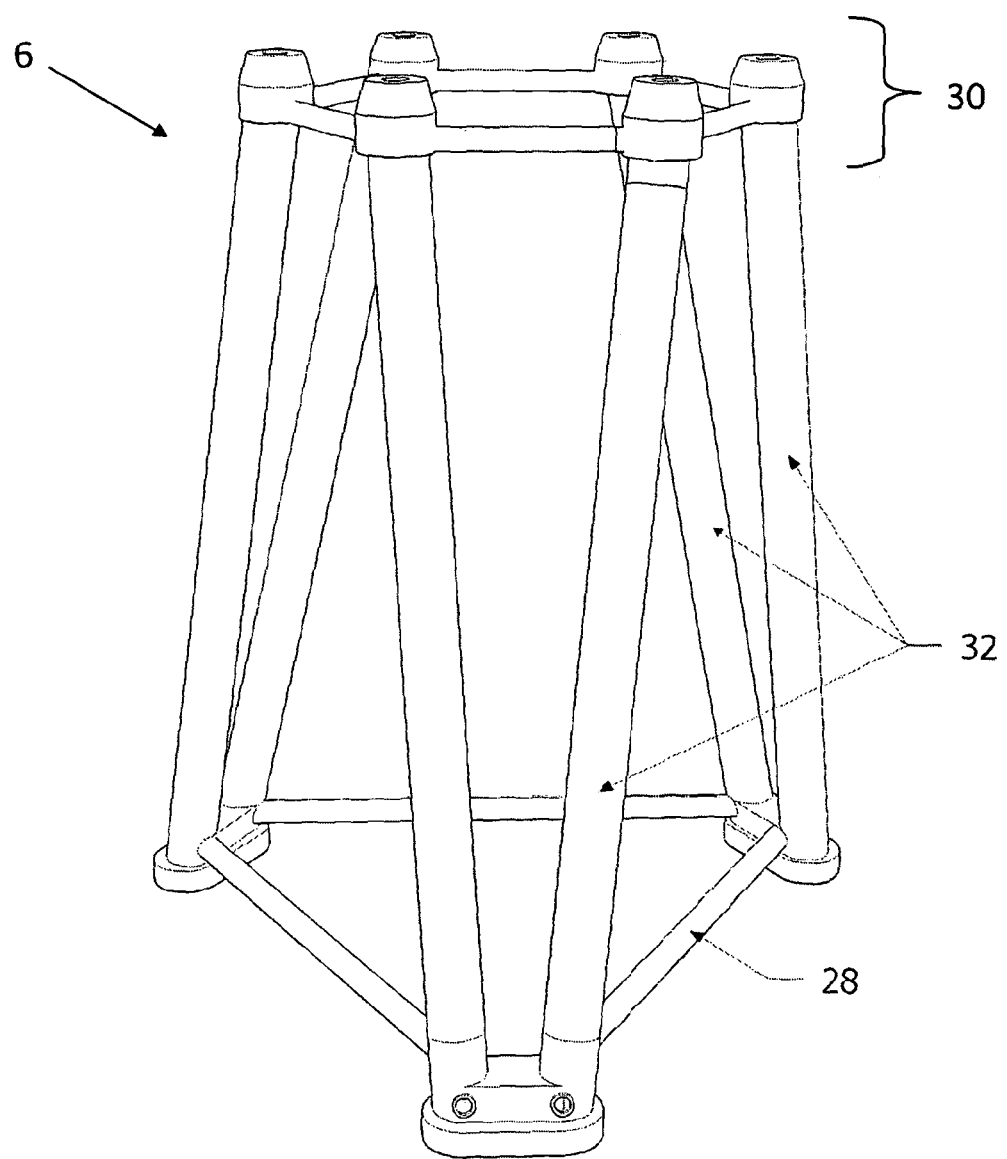
FIG. 9 shows the load-transferring lattice of FIG. 2.

FIG. 8 shows how scour protection mattresses 24 can be attached to an outer edge of the base 4. Seven mattresses 24 are shown in FIG. 8 and are each formed from a series of tubular concrete sections 26 which are connected and held together by polypropylene cables. A single mattress 24' Is shown tied up in a curled or rolled up position prior to deployment. The remaining mattresses 24 are all shown In the deployed position. Once the base 4 has been mounted at its preferred location, the mattresses 24 are untied and the concrete portions are allowed to unfold onto the seabed under the natural weight of the concrete sections themselves.

FIGS. 9 to 14 show the main sub-components of the lattice 6, in particular a basal ring 28, a top ring 30, and three pairs of struts 32 extending substantially vertically between the basal ring 28 and the top ring 30. The struts 32 are cast from concrete as hollow tubular members.

Figure 3:
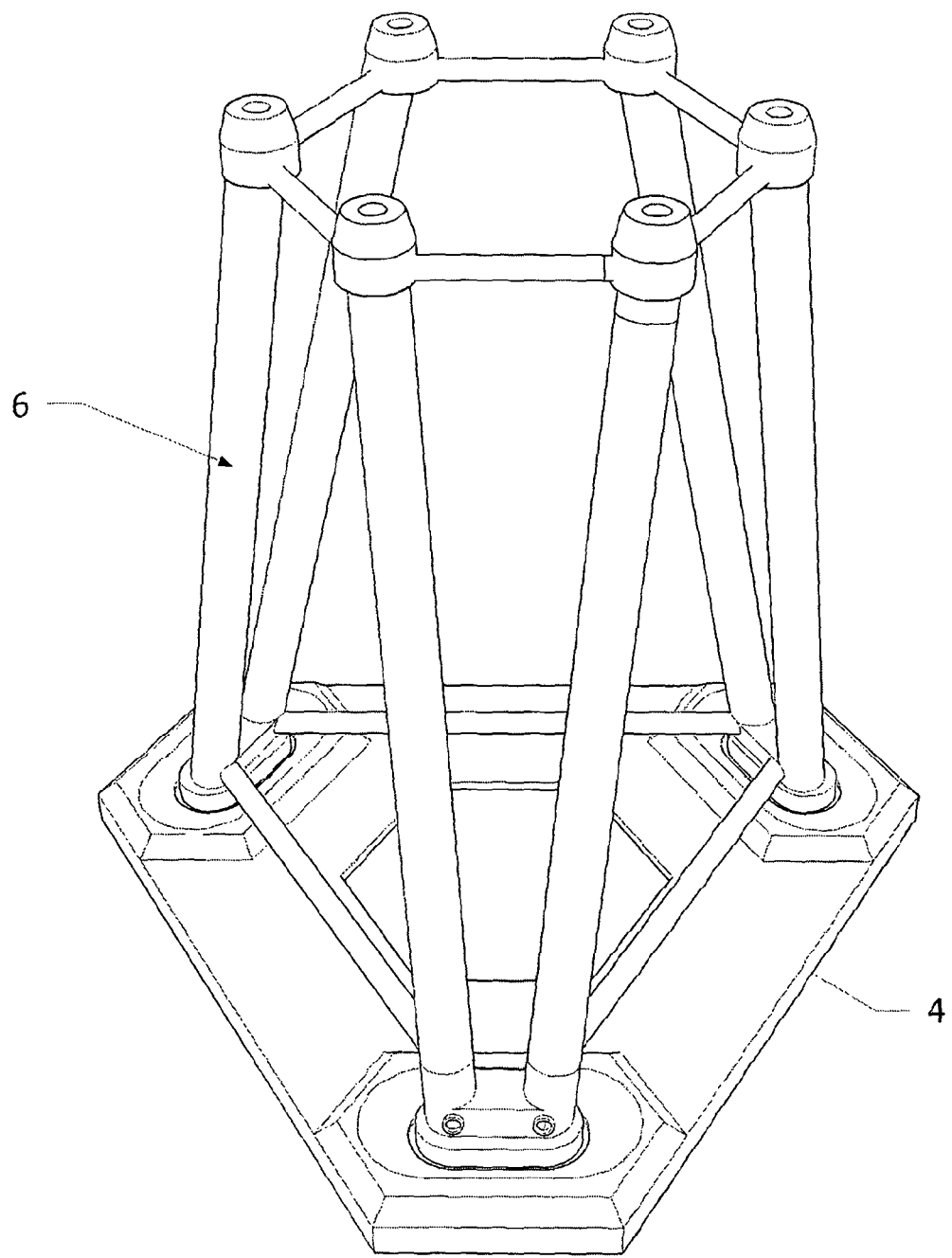
FIG. 3 shows a base and a load-transferring lattice of FIG. 2.
Figure 4:
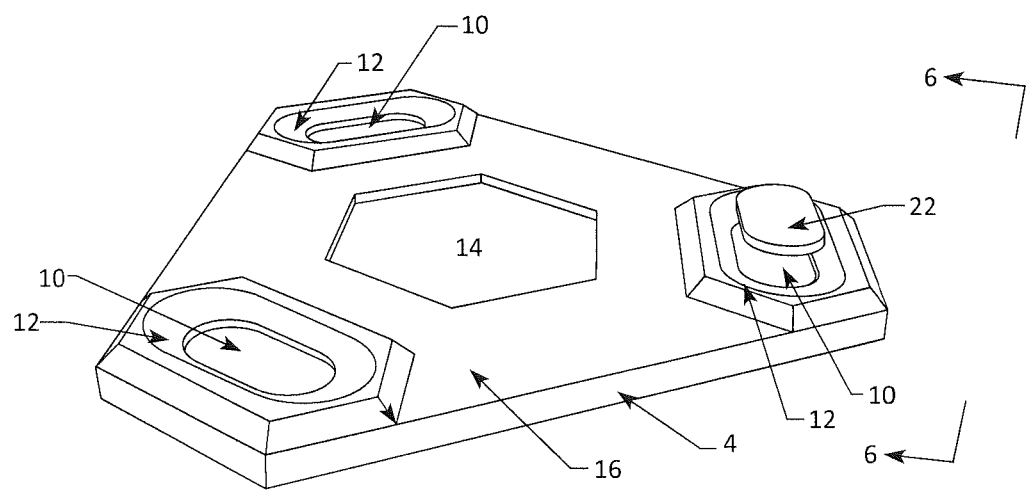
FIG. 4 shows the base of FIG. 2.
Figure 5:
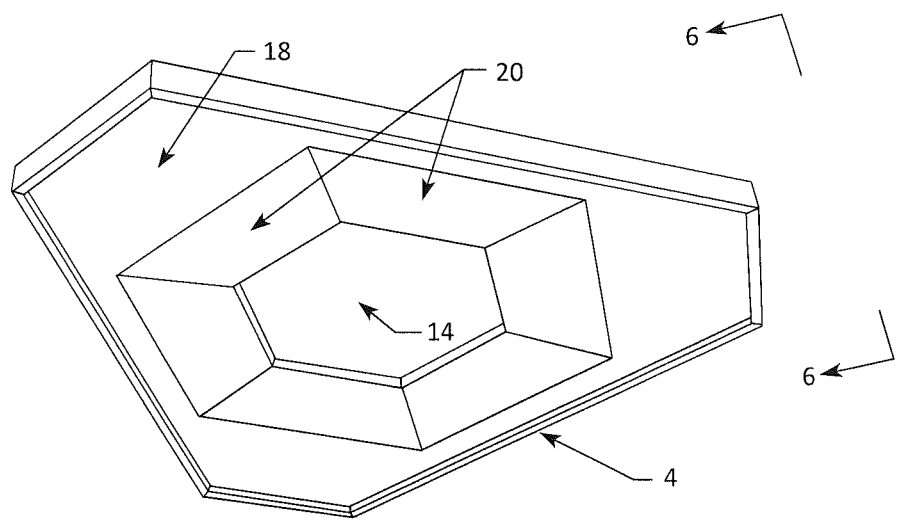
FIG. 5 shows the underside of the base of FIG. 4.
Figure 6:
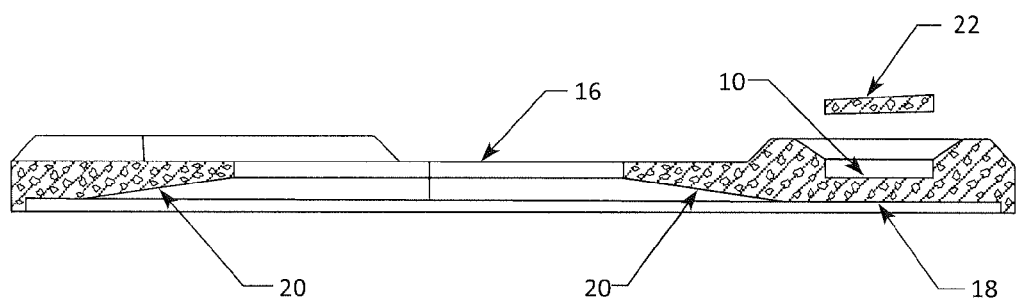
FIG. 6 shows a cross-section through the line 6-6 of the base of FIG. 4.
Figure 10:
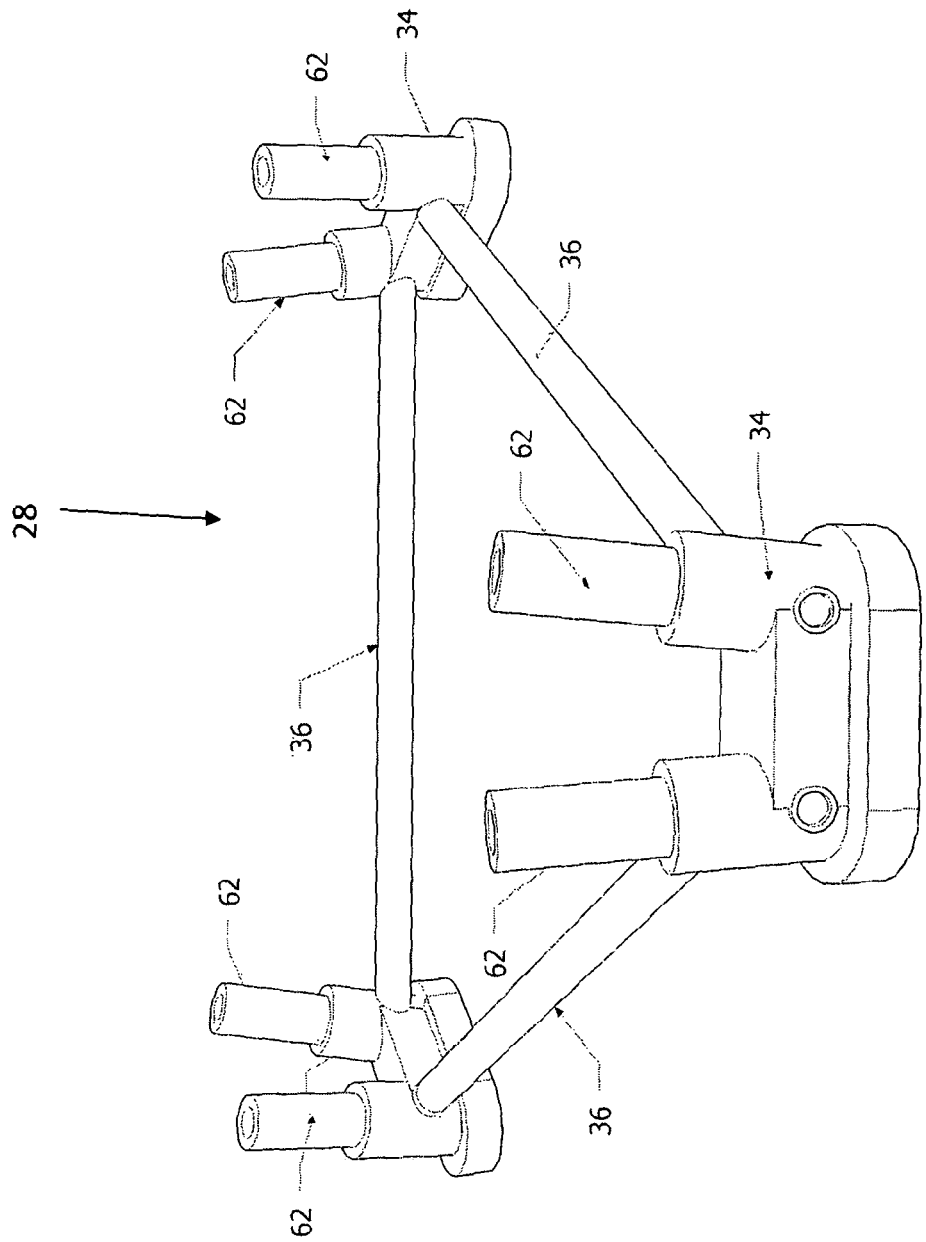
FIG. 10 shows a basal ring of the load-transferring lattice of FIG. 9.
Figure 11:
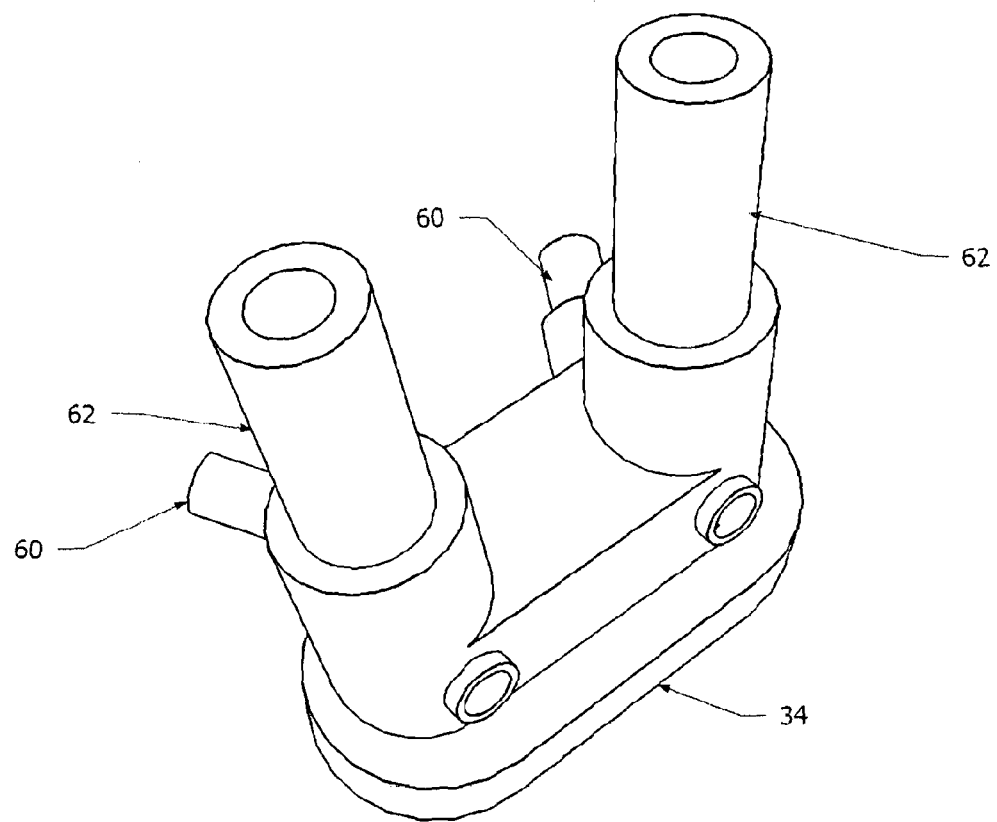
FIG. 11 shows a foot node of the load-transferring lattice of FIG. 9.
Figure 12:
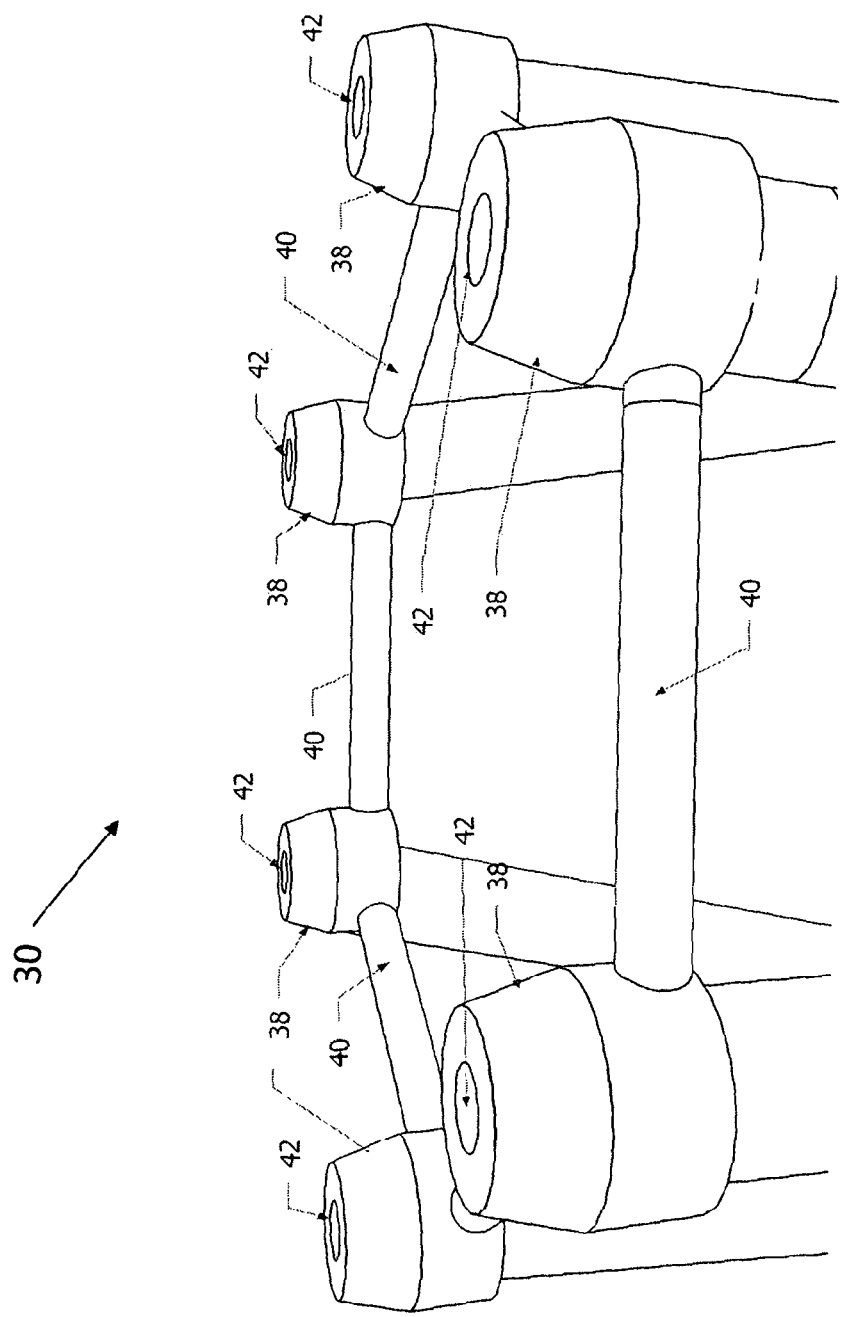
FIG. 12 shows the top ring of the load-transferring lattice of FIG. 9.
Figure 13:
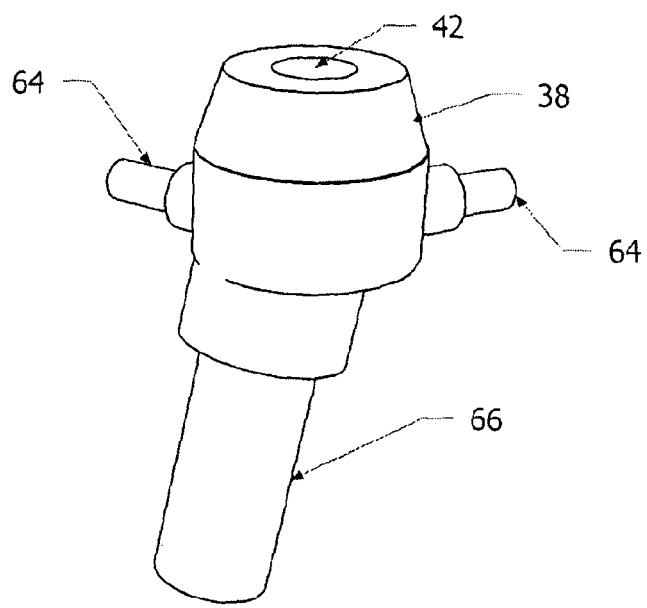
FIG. 13 shows a top node of the load-transferring lattice of FIG. 9.
Figure 14:
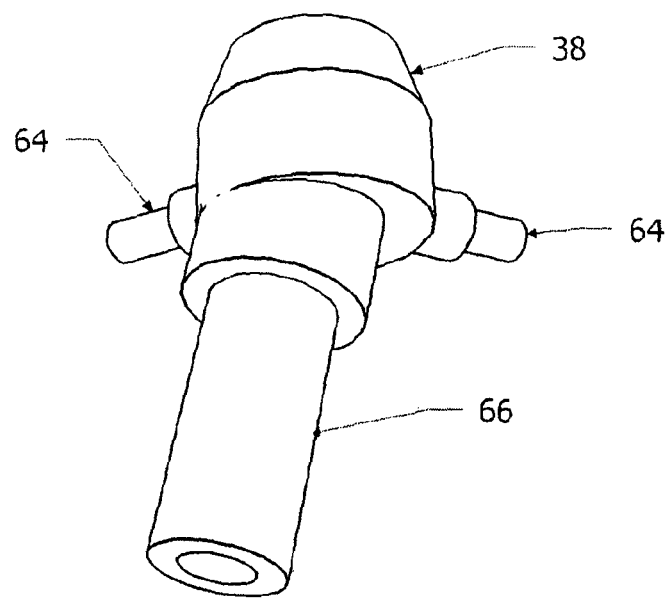
FIG. 14 shows the top node of FIG. 13 viewed from below.
Figure 15:
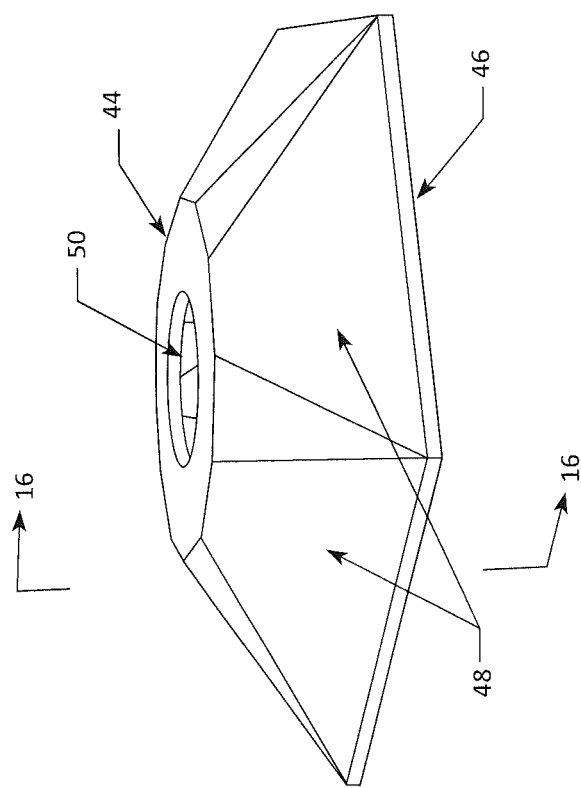
FIG. 15 shows the top piece of FIG. 2.
Figure 16:
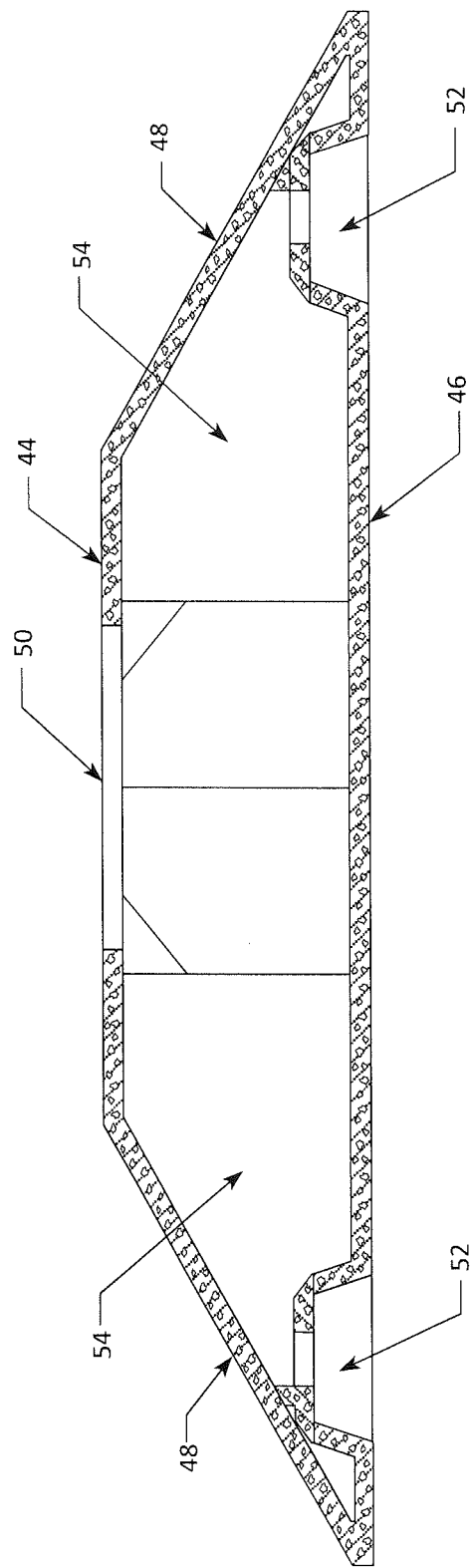
FIG. 16 shows a cross-section through the line 16-16 of the top piece of FIG. 15.
Figure 17:
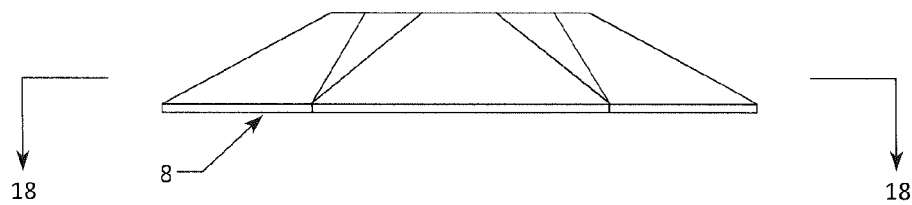
FIG. 17 shows an alternative view of the top piece of FIG. 2.
Figure 18:
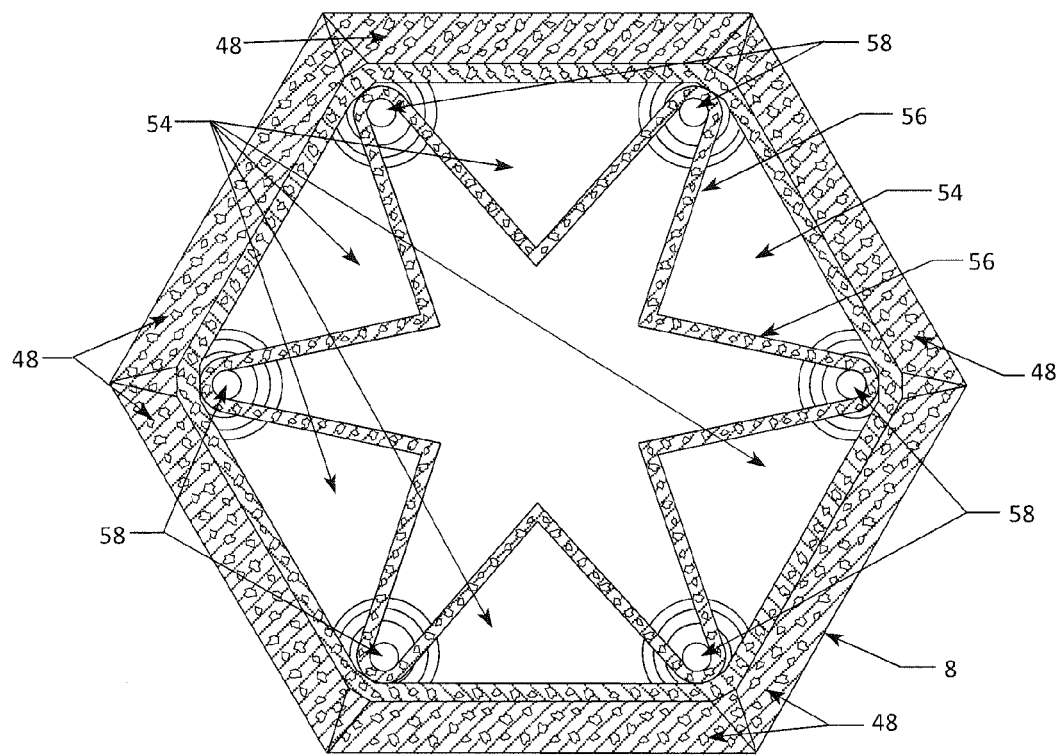
FIG. 18 shows a cross-section through the line 18-18 of the top piece of FIG. 17.
Figure 19:
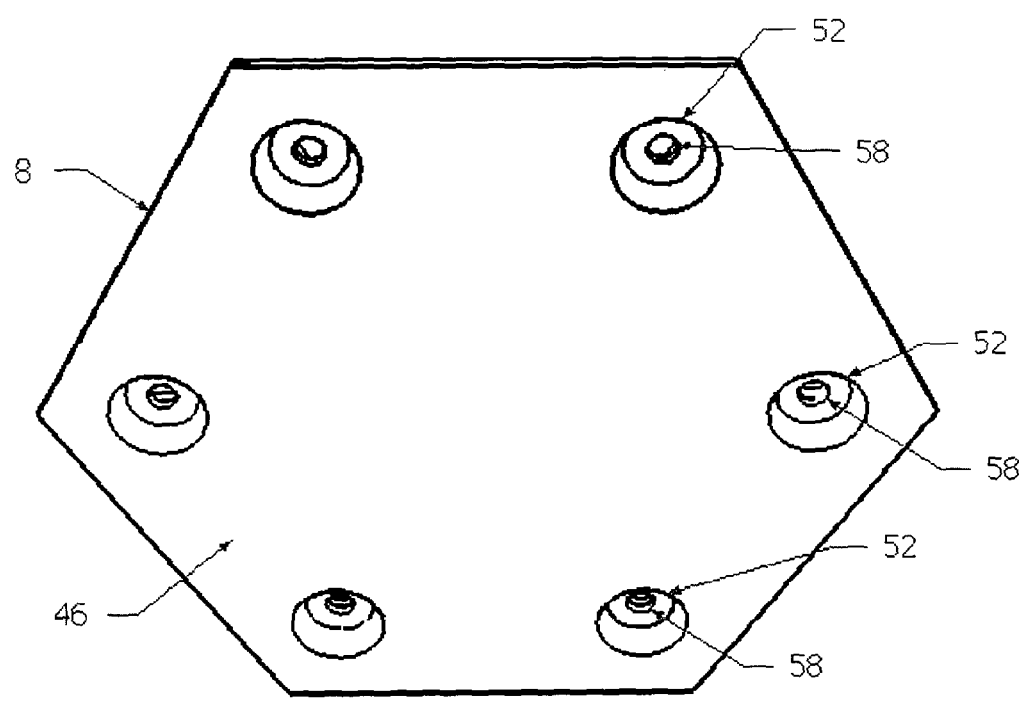
FIG. 19 shows the top piece of FIG. 15 viewed from below.

The basal ring 28 Includes three base nodes 34 and three base struts 36 as can be seen in FIG. 10. Each base node 34 includes a pair of protrusions 60 for receiving an end of a respective base strut 36 such that adjacent base nodes 34 are connected together by a base strut 36. Each base node 34 also includes a pair of protrusions 62 for receiving a lower end of a respective substantially vertically extending strut 32. The base nodes 34 and base struts 36 are cast from concrete, the latter being formed as hollow tubular members. Cables can be routed through the hollow interior of the vertically extending struts 32 and through, cable ducts that are formed in the base nodes 34. FIG. 3 shows how the lattice 6 is mounted onto the base 4 with the base nodes 34 of the basal ring 28 located in the mating interfaces 10.

The top ring 30 includes the six top nodes 38 and six top struts 40. Each top node 38 includes a pair of protrusions 64 for receiving an end of a respective top strut 40 such that adjacent top nodes are connected together by a top strut 40. Each top node 38 also includes a protrusion 66 for receiving an upper end of a substantially vertically extending strut 32, The top nodes 38 and top struts 40 are cast from concrete, the latter being formed as hollow tubular members. Cables can be routed through cable ducts that are formed in the top nodes 38. Each top node 38 includes an opening 42 to rout cables into the top piece S.

The components of the basal ring 28 and top ring 30, as well as the substantially vertical struts 32 may be secured together through the use of industrial adhesives, mechanical mechanisms, such as locking pins, or other suitable means. The sub-components that comprise the structure 1 may incorporate load, or lifting, points such that the structure 1 may be conveniently secured to a crane, winch or other such device, for the deployment of it.

It will be readily appreciated that other designs of lattice 6 can be utilised. Also, the lattice 6 can have any suitable number of substantially vertically extending struts 32, nodes 34, 38 etc. as required for the overall design requirements of the structure 1.

FIGS. 15 to 19 show the top piece 8 which is cast from concrete, The top piece 8 has an upper surface 44 and a lower surface 46 and has sloping exterior walls 48 connecting the upper surface 44 to the bottom surface 46. A central recess 50 is located in the middle of the upper surface 44 to receive a mounting part of an installation such as a wind turbine 2. Mating interfaces 52 on the lower surface 46 provide a connection; between the top piece 8 and the top ring 30 (or more particular, the top nodes 40) of the lattice 6, Empty regions or chambers within the top piece 8 define ballast tanks 54 which are also partially defined by internal walls 56 of the top piece. Openings 58 located at the mating Interfaces 52 are in register with the opening 42 in each top node 38 to facilitate cable routing into the top piece 8.

Figure 20:
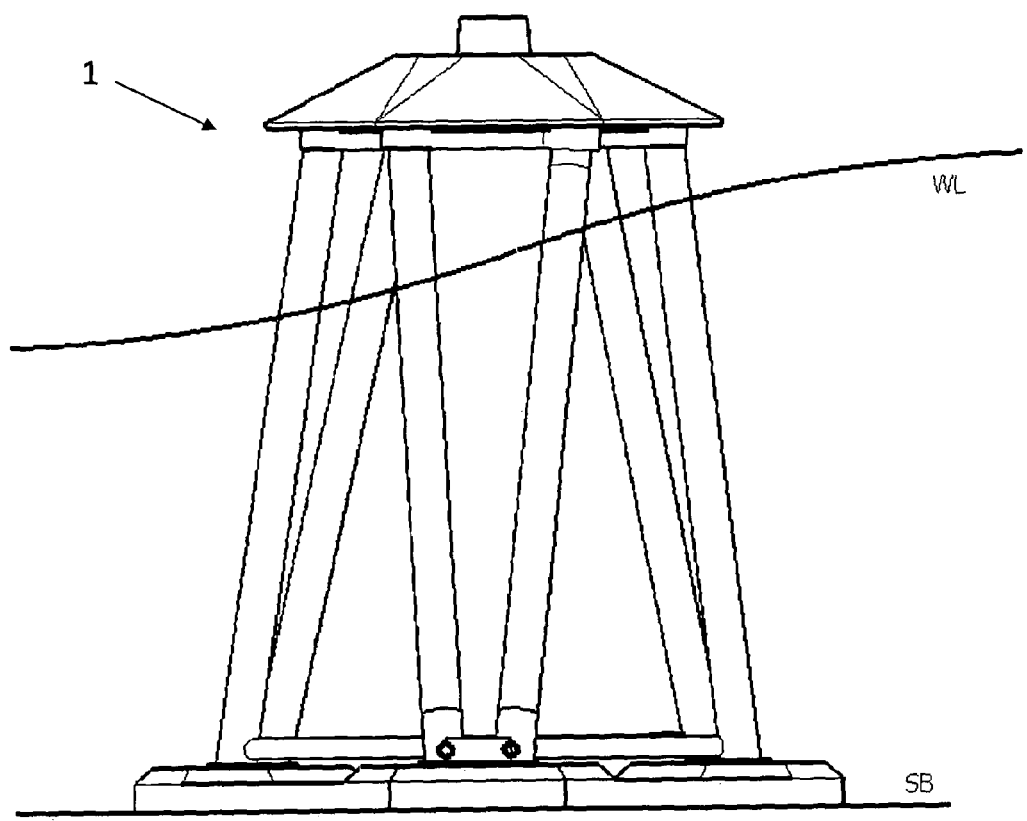
FIG. 20 shows a structure of the present invention mounted on a seabed.

In use, a structure 1 according to the present invention may be assembled prior to installation at a location, or the sub-components (i.e., the base 4, the lattice 6, and the top piece 8) may be transferred separately to the location and the structure 1 assembled on site. FIG. 20 shows a side view of a structure 1 of the present invention in use mounted on the seabed SB showing the structure 1 and how the sub-components are position in relation to the waterline WL.

The invention claimed is:

1. An offshore structure with an offshore installation mounted thereon, the structure comprising:
- a top piece, a base, and a load-transferring lattice connecting the top piece to the base;
- wherein the top piece is located above the waterline and further comprises one or more ballast tanks integrally formed with the top piece, each ballast tank being defined by an empty region or chamber within the top piece and at least partially defined by internal walls of the top piece;
- wherein the base is located below the waterline and positioned on the seabed;
- wherein the base further comprises an upper surface, a lower surface and at least one aperture extending from the upper surface through to the lower surface, the lower surface including at least one tapering surface extending from the aperture;
- wherein the base includes one or more scour protection mattresses;
- wherein the lattice further comprises one or more pairs of substantially vertically extending struts having a hyperboloid configuration;
- wherein the lattice comprises a concrete basal ring adjacent the base;
- wherein the basal ring comprises a plurality of base nodes, each adjacent pair of base nodes being interconnected by a base strut; and
- wherein the lattice comprises a concrete top ring adjacent the top piece.

2. The offshore structure according to claim 1, wherein the top ring includes a plurality of top nodes, each adjacent pair of top nodes being interconnected by a base strut.

3. The offshore structure according to claim 1, wherein the substantially vertically extending struts extend between the basal ring and the top ring.

4. An offshore structure with an offshore installation mounted thereon, the structure comprising:
- a top piece, a base, and a load-transferring lattice connecting the top piece to the base;
- wherein the top piece is located above the waterline and further comprises one or more ballast tanks integrally formed with the top piece, each ballast tank being defined by an empty region or chamber within the top piece and at least partially defined by internal walls of the top piece;
- wherein the base is located below the waterline and positioned on the seabed;
- wherein the base further comprises an upper surface, a lower surface and at least one aperture extending from the upper surface through to the lower surface, the lower surface including at least one tapering surface extending from the aperture;
- wherein the base includes one or more scour protection mattresses;
- wherein the lattice further comprises one or more pairs of substantially vertically extending struts having a hyperboloid configuration; and
- wherein each scour protection mattress comprises a plurality of substantially cylindrical concrete portions which are attached together by attachment means.

* * * * *